(12) United States Patent
Ota et al.

(10) Patent No.: US 10,522,810 B2
(45) Date of Patent: Dec. 31, 2019

(54) BATTERY MONITORING DEVICE

(71) Applicant: Yazaki Corporation, Tokyo (JP)

(72) Inventors: Takao Ota, Makinohara (JP); Masahiro Takamatsu, Makinohara (JP)

(73) Assignee: YAZAKI CORPORATION, Tokyo (JP)

( * ) Notice: Subject to any disclaimer, the term of this patent is extended or adjusted under 35 U.S.C. 154(b) by 106 days.

(21) Appl. No.: 15/672,809

(22) Filed: Aug. 9, 2017

(65) Prior Publication Data
US 2018/0047968 A1 Feb. 15, 2018

(30) Foreign Application Priority Data
Aug. 10, 2016 (JP) ................................. 2016-158043

(51) Int. Cl.
*H01M 2/00* (2006.01)
*H01M 2/20* (2006.01)
*H01M 10/48* (2006.01)

(52) U.S. Cl.
CPC .......... *H01M 2/206* (2013.01); *H01M 2/208* (2013.01); *H01M 10/482* (2013.01); *H01M 10/484* (2013.01); *H01M 2220/20* (2013.01)

(58) Field of Classification Search
CPC .. H01M 2/206; H01M 10/482; H01M 10/484; H01M 2/208; H01M 2220/20
See application file for complete search history.

(56) References Cited

U.S. PATENT DOCUMENTS

| 6,046,572 A * | 4/2000 | Matthews ............... F21L 4/005 320/114 |
| 2013/0130070 A1* | 5/2013 | Adachi ............. H01M 10/4207 429/53 |

(Continued)

FOREIGN PATENT DOCUMENTS

| CN | 103427064 A | 12/2013 |
| CN | 104143666 A | 11/2014 |

(Continued)

OTHER PUBLICATIONS

Communication dated Jun. 12, 2018 issued by the Japanese Patent Office in counterpart Japanese Patent Application No. 2016-158043.

(Continued)

*Primary Examiner* — Cynthia H Kelly
*Assistant Examiner* — Monique M Wills
(74) *Attorney, Agent, or Firm* — Sughrue Mion, PLLC

(57) ABSTRACT

A battery monitoring device includes a plurality of voltage detection line, each of which configured to be electrically connected to an electrode of a respective one of a plurality of unit batteries in a battery assembly, the battery assembly being constituted by the unit batteries, a plurality of electronic circuits, each of which configured to be connected to a respective one of the voltage detection lines and to detect a voltage of a corresponding one of the unit batteries, a plurality of voltage detection substrates configured to be mounted to the unit batteries respectively, wherein each of the voltage detection lines and each of the electronic circuits are mounted on a respective one of the voltage detection substrates, and a communication line that connects the plurality of voltage detection substrates and a battery control unit.

5 Claims, 19 Drawing Sheets

(56) References Cited

U.S. PATENT DOCUMENTS

2013/0302660 A1  11/2013  Shiraishi et al.
2014/0335378 A1  11/2014  Kuroda

FOREIGN PATENT DOCUMENTS

| JP | 2011-133418 A | 7/2011 |
| JP | 2014-220157 A | 11/2014 |
| JP | 2015-41595 A | 3/2015 |
| JP | 5786891 B2 | 9/2015 |
| JP | 2016-12510 A | 1/2016 |
| JP | 2016-18634 A | 2/2016 |
| WO | 2012/098843 A1 | 7/2012 |

OTHER PUBLICATIONS

Communication dated Aug. 28, 2018, issued by the Japanese Patent Office in counterpart Japanese Patent Application No. 2016-158043.

* cited by examiner

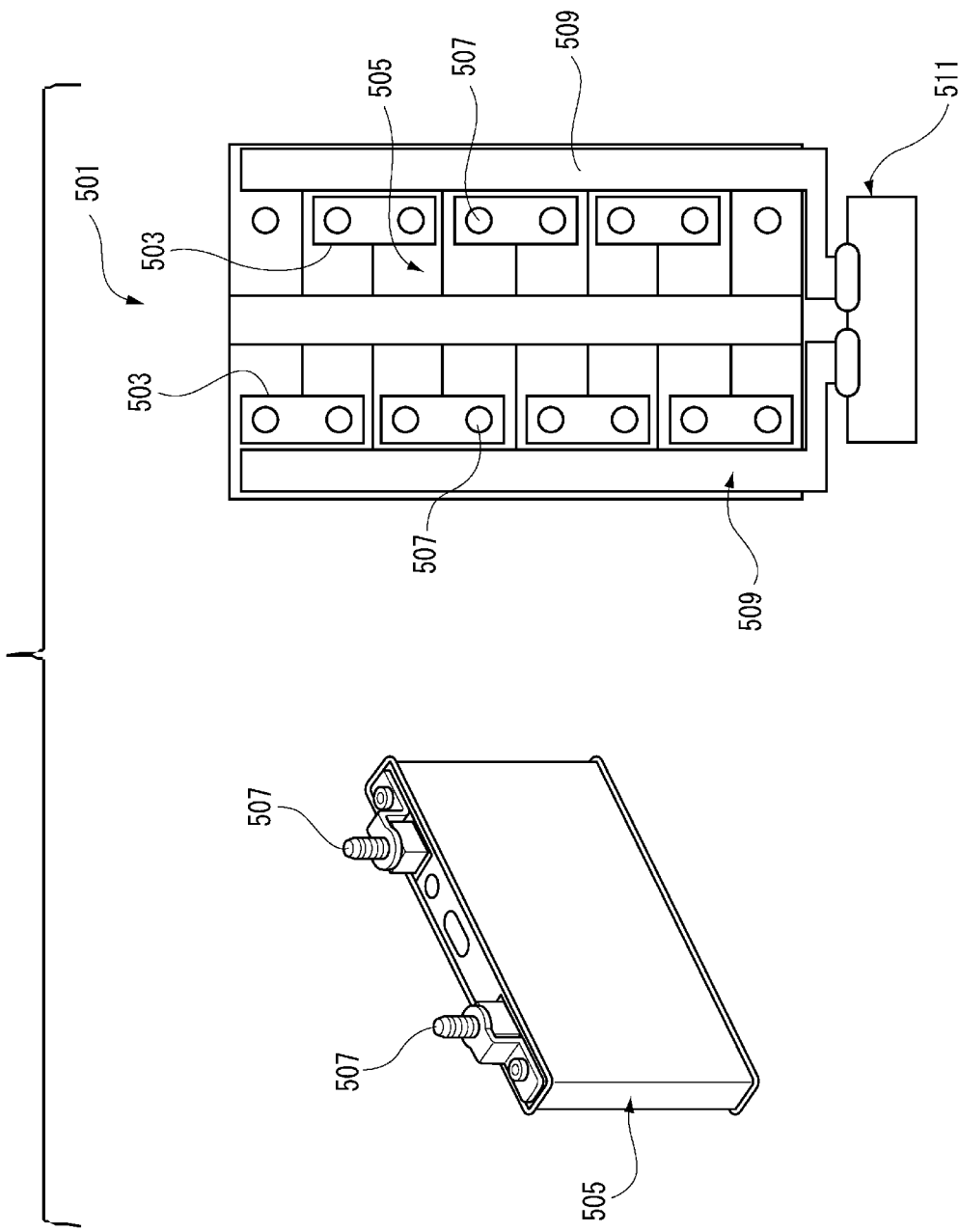

BATTERY MONITORING DEVICE

CROSS REFERENCE TO RELATED APPLICATIONS

This application is based on Japanese Patent Application (No. 2016-158043) filed on Aug. 10, 2016, the contents of which are incorporated herein by reference.

BACKGROUND OF THE INVENTION

1. Field of the Invention

The present invention relates to a battery monitoring device.

2. Description of the Related Art

An electric storage device that is a battery assembly has a configuration in which a plurality of unit batteries (battery cells) are connected in parallel to each other. In an electric storage device 501 illustrated in FIG. 21, electrode terminals 507 of battery cells 505 adjacent to each other are connected by a bus bar 503, and a plurality of the bus bars 503 are connected to each other by a voltage detection line 509 such as a flexible flat cable. The voltage detection line 509 is led out from both sides of the electrode terminals 507 of the battery cells 505 which are arranged in parallel to each other, and is connected to a battery ECU (Electronic Control Unit) 511 including a battery cell voltage detecting circuit provided in another box. According to this, a long interconnection is necessary for the voltage detection line 509.

To resolve the above problem about the long interconnection, JP-A-2015-41595 and JP-B-5786891 disclose a configuration in which a voltage detecting circuit is mounted on a substrate, and an interconnection that is connected to a battery ECU deviates to a single side of an electric storage device. For example, the electric storage device disclosed in JP-B-5786891 includes a plurality of electric storage elements (battery cells) which are arranged in a predetermined direction, a substrate (voltage detection substrate) through which an electrode terminal of each of the electric storage element passes, and a bus bar which is connected to the electrode terminal that passes through the substrate, and electrically connects the plurality of electric storage elements. A voltage detection line that is electrically connected to the electrode terminal and is configured to detect a voltage of the electric storage element, and an electronic circuit to which the voltage detection line is connected are mounted on the substrate. According to the electric storage device, it is possible to simplify a configuration of detecting a voltage of the electric storage element, and it is possible to wire the interconnection (communication line), which is configured to connect the electronic circuit to the battery ECU, to be close to a single side of the electric storage device.

However, in the battery monitoring device of the electric storage device in the related art, the voltage detection substrate has an integral structure in which the voltage detection line that is electrically connected to the electrode terminal to detect a voltage of each of the electric storage element, and the electronic circuit including a fuse, a resistor, a capacitor, a thermistor, a battery monitoring IC, and the like are mounted on a substrate. Accordingly, a structure is simplified, but when the number of the electric storage elements in the electric storage device is changed, as the voltage detection substrate, the same substrate cannot be used. As a result, it is necessary to newly prepare an integrated substrate.

In addition, in the substrate that is formed as one sheet, there is a disadvantage that it is difficult to absorb a pitch tolerance (individual difference of cells, expansion) of the electrode terminal between the electric storage elements.

SUMMARY OF THE INVENTION

The invention has been made in consideration of the above-described situations, and an object thereof is to provide a battery monitoring device that is capable of easily coping with increase and decrease in the number of unit batteries through addition and reduction of a voltage detection substrate, and is capable of absorbing a pitch tolerance of an electrode between unit batteries.

The object of the invention is accomplished by the following configuration.

(1) According to an aspect of the invention, there is provided a battery monitoring device including: a plurality of voltage detection line, each of which configured to be electrically connected to an electrode of a respective one of a plurality of unit batteries in a battery assembly, the battery assembly being constituted by the unit batteries; a plurality of electronic circuits, each of which configured to be connected to a respective one of the voltage detection lines and to detect a voltage of a corresponding one of the unit batteries; a plurality of voltage detection substrates configured to be mounted to the unit batteries respectively, wherein each of the voltage detection lines and each of the electronic circuits are mounted on a respective one of the voltage detection substrates; and a communication line that connects the plurality of voltage detection substrates and a battery control unit.

According to the battery monitoring device having the configuration of (1), the plurality of voltage detection substrates which are respectively mounted to the unit batteries, and the battery control portions are connected to each other with the communication line, thereby constituting the battery monitoring device. Accordingly, even when the number of the unit batteries increases or decreases, it is possible to easily cope with the increase or the decrease through addition or reduction of the voltage detection substrate. In addition, it is also easy to circuit-print the voltage detection line in the voltage detection substrate, or it is also easy to dispose the communication line on a single side of the battery assembly. Accordingly, it is possible to simplify wiring. In addition, in the battery monitoring device having the above-described configuration, the plurality of voltage detection substrates are respectively mounted to the plurality of unit batteries. The plurality of voltage detection substrates are connected to each other by the communication line. Accordingly, the communication line, which connects the plurality of voltage detection substrates, can absorb a pitch tolerance of the electrode between the plurality of unit batteries due to an individual difference of a cell, expansion, and the like.

(2) In the battery monitoring device according to (1), the battery monitoring device further includes a duct configured to be mounted to the battery assembly. Each of the voltage detection substrates has an opening, through which gas exhausted from a valve passes and is guided to the duct, and the valve being provided on each of the unit batteries so as to release the gas being generated at the inside of a corresponding one of the unit batteries to the outside. The duct has an integral structure with the plurality of voltage detection substrates.

According to the battery monitoring device having the configuration of (2), the plurality of voltage detection substrates has an integral structure with the duct, and thus it is possible to collectively mount the duct and the voltage detection substrates to the battery assembly without deteriorating a function of exhausting the gas, which is generated at the inside of the unit battery, to the outside. According to this, assembling becomes easy. In addition, the number of components is reduced, and thus simplification of component management is accomplished.

(3) In the battery monitoring device according to (1), a battery monitoring device further includes a plurality of battery monitoring modules, each of which includes a housing being integrally formed on the corresponding one of the voltage detection substrates, each of the battery monitoring modules being mounted to respective one of the unit batteries. A pair of electrode insertion concave portions configured to cover a pair of the electrodes in corresponding one of the unit batteries is formed in the respective one of the housings of the battery monitoring modules. A spring terminal is contained in each of the pair of electrode insertion concave portions and configures to electrically connect the electrode and the voltage detection line in each of the pair of electrode insertion concave portions.

According to the battery monitoring device having the configuration of (3), the battery monitoring modules including the pair of electrode insertion concave portions in the housing are respectively mounted to the unit batteries. The spring terminal is accommodated in the electrode insertion concave portions of the housing. Each of the battery monitoring modules is mounted to each of the unit battery in such a manner that the pair of electrodes are inserted into the electrode insertion concave portions. The pair of electrodes inserted into the electrode insertion concave portions is electrically connected to the voltage detection line by the spring terminal. Accordingly, according to the battery monitoring device, it is possible to connect the pair of electrodes in each of the unit batteries to the voltage detection line by each of the battery monitoring modules in a one-touch manner at a time. Accordingly, work of mounting of the voltage detection substrate becomes easy.

According to the battery monitoring device according to the invention, even when the number of unit batteries increases or decreases, it is possible to easily cope with the increase and decrease through addition or reduction of a voltage detection substrate, and it is possible to absorb a pitch tolerance of an electrode between the unit batteries.

Hereinbefore, the invention has been described in brief. In addition, details of the invention will be more clear through the following aspect (hereinafter, referred to as "embodiment") for carrying out the invention with reference to accompanying drawings.

BRIEF DESCRIPTION OF THE DRAWINGS

FIG. 21 is a view illustrating an electric storage device of the related art in which a voltage detection line is led out from both sides of battery cells.

DETAILED DESCRIPTION OF THE EXEMPLARY EMBODIMENTS

Hereinafter embodiments of the invention will be described with reference to the accompanying drawings.

Figure 1:
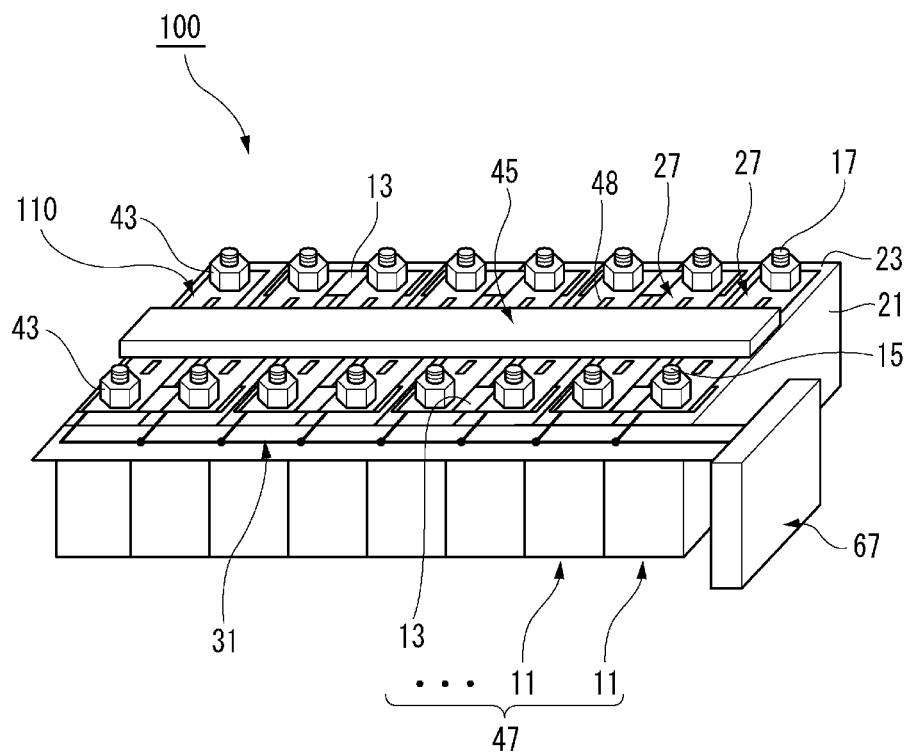
FIG. 1 is a perspective view schematically illustrating a configuration of an electric storage device including a battery monitoring device according to a first embodiment of the invention.
Figure 1:
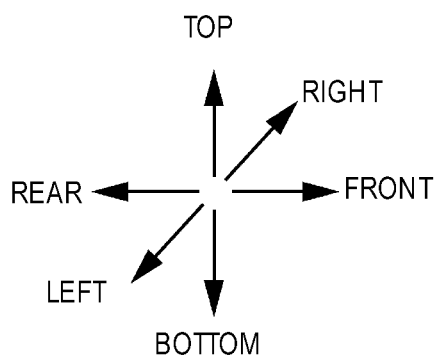
Figure 2:
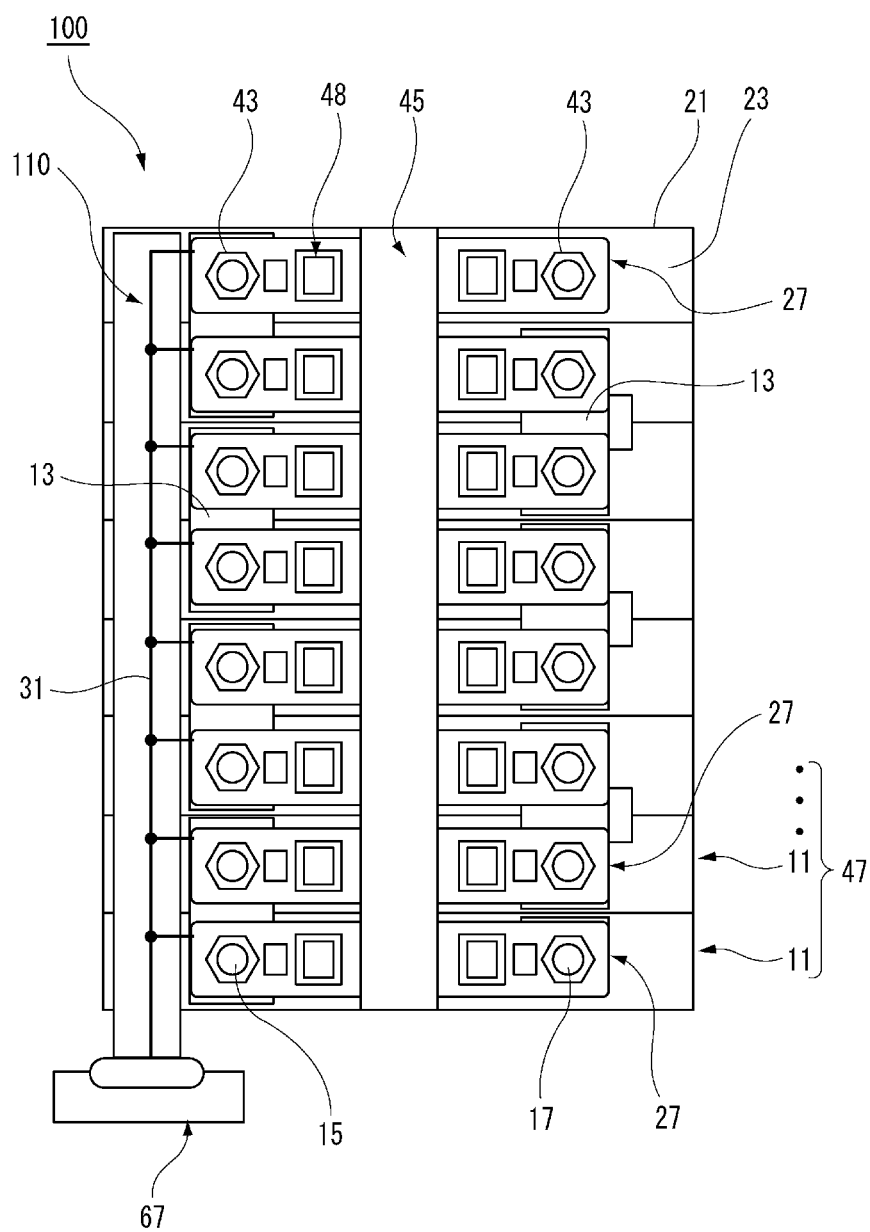
FIG. 2 is a plan view of the electric storage device illustrated in FIG. 1.

FIG. 1 is a perspective view schematically illustrating a configuration of an electric storage device 100 including a battery monitoring device 110 according to a first embodiment of the invention, and FIG. 2 is a plan view of the electric storage device 100 illustrated in FIG. 1. Furthermore, in this embodiment, an upper and lower direction, a front and rear direction, and a left and right direction conform to arrow directions illustrated in FIG. 1.

The electric storage device 100 including the battery monitoring device 110 according to this embodiment can be mounted in a vehicle, and can be used as a power source that allows the vehicle to travel. That is, the electric storage device 100 can allow the vehicle to travel by converting electric energy that is output into kinetic energy by a motor and generator 11. In addition, in the electric storage device 100, when converting kinetic energy, which occurs during braking of the vehicle, into electric energy by the motor and generator 11, it is possible to store the electric energy as regenerative electric power.

As illustrated in FIG. 1 and FIG. 2, the electric storage device 100 includes a plurality of a plurality of unit batteries 11 which are arranged in the front and rear direction. As the unit batteries 11, a secondary battery such as a nickel-hydrogen battery and a lithium ion battery can be used. Here, the plurality of unit batteries 11 are electrically connected to each other in series. That is, a bus bar 13 is disposed on an upper surface of the unit batteries 11. The bus bar 13 electrically connects two unit batteries 11, which are adjacent to each other in the front and rear direction, in series. The number of the unit batteries 11 which constitute the electric storage device 100 can be appropriately set on the basis of a demanded output and the like.

Each of the unit batteries 11 is provided with a rectangular battery main body 21, and a pair of positive electrode terminal 15 and negative electrode terminal 17 which respectively protrude from one end and the other end of the upper surface 23 of the battery main body 21. The positive electrode terminal 15 is electrically connected to a positive electrode plate (current collection plate) of a power generation element inside the battery main body 21. The negative electrode terminal 17 is electrically connected to a negative electrode plate (current collection plate) of the power generation element inside the battery main body 21. In addition, a valve 25 is provided on the upper surface 23 of the battery main body 21 (refer to FIGS. 6A to 6C). The valve 25 is provided between the positive electrode terminal 15 and the negative electrode terminal 17 in the left and right direction. The valve 25 is used to exhaust a gas, which is generated at the inside of the battery main body 21, to the outside of the battery main body 21.

For example, when overcharging of the unit battery 11 and the like are performed, there is a concern that a gas may be generated mainly from an electrolytic solution. The battery main body 21 is in a hermetically closed state, and thus an internal pressure of the battery main body 21 rises in accordance with the gas generation. When the internal pressure of the battery main body 21 reaches an operation pressure of the valve 25, the valve 25 is changed from a closed state to an opened state, and thus it is possible to exhaust the gas to the outside of the battery main body 21.

As the valve 25, a so-called fracture type valve or a so-called returning type valve can be used. In the fracture type valve, the valve 25 is irreversibly changed from the closed state to the opened state. For example, the fracture type valve can be formed by performing carving with respect to the upper surface 23 of the battery main body 21. On the other hand, in the returning type valve, the valve 25 is reversibly changed between the closed state and the opened state in correspondence with the internal pressure of the battery main body 21. For example, it is possible to construct the returning type valve by using a spring.

The battery monitoring device 110 of the electric storage device 100 according to this embodiment includes a voltage detection substrate 27, a voltage detection line 29, an electronic circuit, and a communication line 31.

Figure 3:
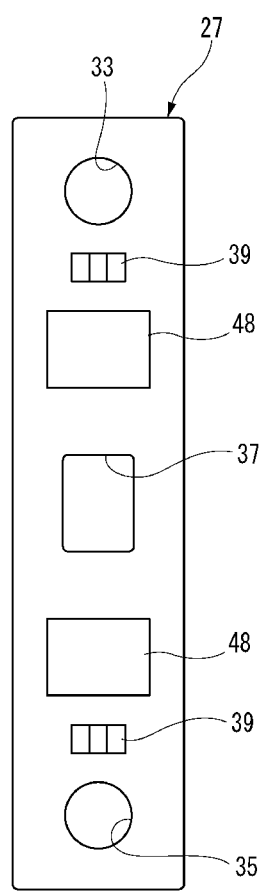
FIG. 3 is a plan view of a voltage detection substrate illustrated in FIG. 2.
Figure 4:
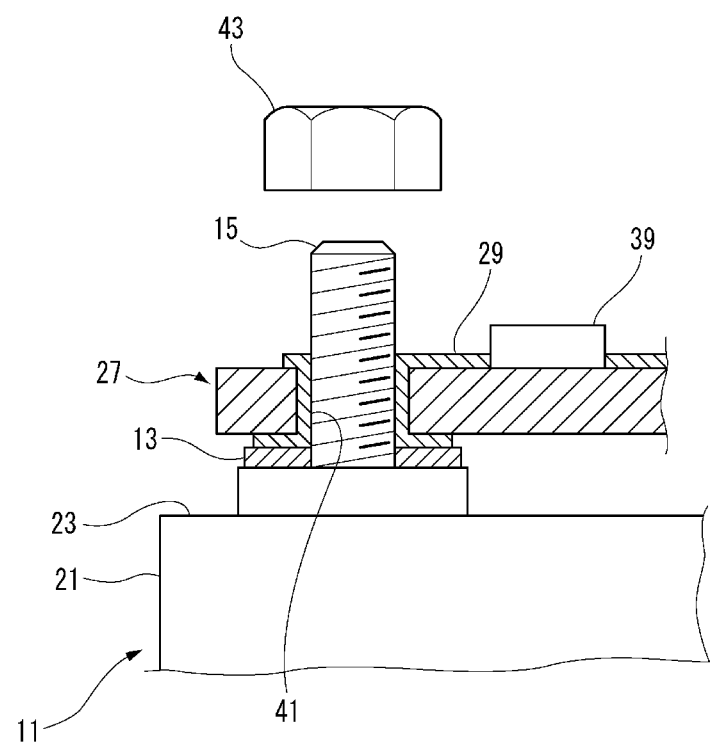
FIG. 4 is a cross-sectional view illustrating a connection portion between an electrode of a unit battery and the voltage detection substrate.
Figure 5:
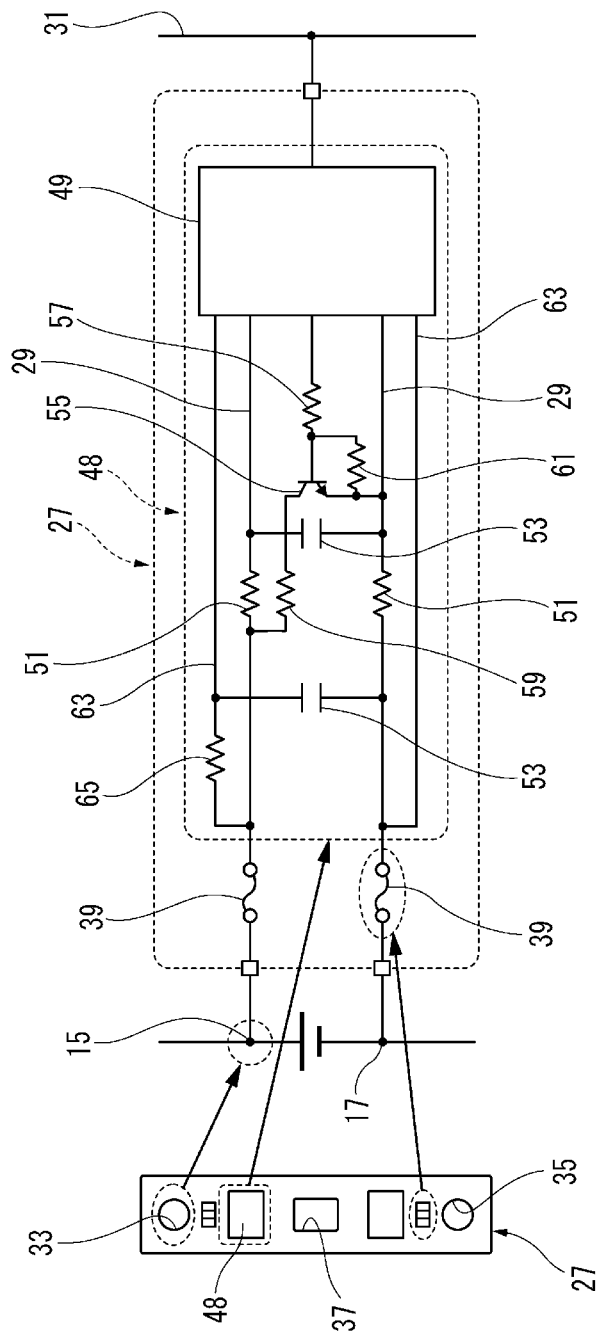
FIG. 5 is a view illustrating a circuit configuration of the battery monitoring device.

FIG. 3 is a plan view of the voltage detection substrate 27 illustrated in FIG. 2, FIG. 4 is a cross-sectional view illustrating a connection portion between the positive electrode terminal (electrode) 15 of the unit battery 11 and the voltage detection substrate 27, and FIG. 5 is a view illustrating a circuit configuration of the battery monitoring device 110.

The voltage detection substrate 27 is mounted to each of the unit batteries 11. A circuit-printed voltage detection line 29 and an electronic circuit are mounted on the voltage detection substrate 27 (refer to FIG. 5). A positive electrode terminal hole 33 and a negative electrode terminal hole 35, which are connected to the positive electrode terminal 15 and the negative electrode terminal 17, are provided in both ends of the voltage detection substrate 27 in the left and right direction. A battery smoke exhaust port 37 is punched between the positive electrode terminal hole 33 and the negative electrode terminal hole 35. The battery smoke exhaust port 37 of the voltage detection substrate 27 is connected to the valve 25 of the battery main body 21. A chip fuse 39, and an electronic circuit 48 such as a cell monitoring IC 49 are respectively mounted between the battery smoke exhaust port 37 and the positive electrode terminal hole 33, and between battery smoke exhaust port 37 and the negative electrode terminal hole 35.

The voltage detection substrate 27 includes a through-hole 41, which is provided with a conductor, at an inner periphery of the positive electrode terminal hole 33 and the negative electrode terminal hole 35. The conductor of the through-hole 41 is connected to the voltage detection line 29 that is circuit-printed in the voltage detection substrate 27. For example, in the voltage detection substrate 27 in which the positive electrode terminal 15 is inserted into the positive electrode terminal hole 33, as illustrated in FIG. 4, a nut 43 is screwed to the positive electrode terminal 15. According to this, the positive electrode terminal 15 is electrically connected to the voltage detection line 29 through the positive electrode terminal hole 33.

In the battery monitoring device 110 according to this embodiment, a duct 45, which extends in the front and rear direction of a battery assembly 47, is disposed on an upper surface of a plurality of the voltage detection substrates 27. A bottom surface of the duct 45 is in contact with the upper surface 27 of each of the voltage detection substrates 27. The duct 45 allows a gas, which is exhausted from the valve 25 of the unit battery 11, to flow in through the battery smoke exhaust port 37, and allows the gas to move in a direction to be spaced away from the battery assembly 47. For example, when mounting the electric storage device 100 provided with the battery monitoring device 110 on a vehicle, it is possible to exhaust the gas exhausted from the valve 25 to the outside of the vehicle by using the duct 45.

In the battery monitoring device 110 of the electric storage device 100 according to this embodiment, the voltage detection substrate 27 is mounted for each of a plurality of the unit batteries 11. The voltage detection substrate 27 is provided with the voltage detection line 29. Accordingly, the voltage detection line 29 is electrically connected to the positive electrode terminal 15 and the negative electrode terminal 17 of each of the unit batteries 11 in the battery assembly 47 that is constituted by the plurality of unit batteries 11.

As illustrated in FIG. 5, the cell monitoring IC 49, which is provided in the voltage detection substrate 27, is connected to the voltage detection line 29. The electronic circuit 48, which detects a voltage of each of the unit batteries 11, includes a chip fuse 39, resistors 51 and 59, a capacitor 53, a cell monitoring IC 49, and the like. In addition, a thermistor may also be mounted in the electronic circuit 48 of this embodiment.

In the battery monitoring device 110, one cell monitoring IC 49 monitors one unit battery 11. The positive electrode terminal 15 and the negative electrode terminal 17 of each of the unit batteries 11 are connected to the cell monitoring IC 49 through the voltage detection line 29. The chip fuse 39 is provided to each voltage detection line 29, and the chip fuse 39 is used to suppress an excessive current from flowing from the unit battery 11 to the cell monitoring IC 49. That is, when an excessive current is apt to flow from the unit battery 11 to the cell monitoring IC 49, the chip fuse 39 is melted down, and thus it is possible to block connection between the unit battery 11 and the cell monitoring IC 49.

The voltage detection line 29 is provided with the resistor 51, and the resistor 51 is electrically connected to the chip fuse 39 in series. The resistor 51 constitutes an RC filter in combination with the capacitor 53, and blocks a high-frequency noise component of the unit battery 11. Furthermore, the resistor 51 may be omitted.

The electronic circuit 48 is provided with an npn type transistor 55. A base of the transistor 55 is connected to the cell monitoring IC 49 through a discharging resistor 57. An emitter of the transistor 55 is connected to the voltage detection line 29, which is connected to the negative electrode terminal 17 of the unit battery 11, through the resistor 51, and a collector of the transistor 55 is connected to the voltage detection line 29, which is connected to the positive electrode terminal 15 of the unit battery 11, through the resistor 59. One end of the resistor 61 is connected to a portion between the base and the discharging resistor 57, and the other end of the resistor 61 is connected to the voltage detection line 29 that is connected to the cell monitoring IC 49.

In the unit battery 11, two capacitors 53 are electrically connected to each other in parallel through the voltage detection line 29. One end of one of the capacitors 53 is connected to the voltage detection line 29, which is connected to the positive electrode terminal 15 of the unit battery 11, through the resistor 59, and the other end thereof is connected to the voltage detection line 29 that is connected to the negative electrode terminal 17 of the unit battery 11. In addition, one end of the other capacitor 53 is connected to the voltage detection line 29, which is connected to the positive electrode terminal 15 of the unit battery 11, through the resistor 51, and the other end is connected to the voltage detection line 29, which is connected to the negative electrode terminal 17 of the unit battery 11, through the resistor 51.

Electric charges of the unit battery 11 are charged to the capacitor 53. A voltage value of the two capacitors 53 becomes approximately the same as a voltage value of the unit battery 11. The cell monitoring IC 49 can acquire the voltage value of the unit battery 11 by detecting the voltage value of the two capacitors 53. One end of the discharging resistor 57 is connected to the cell monitoring IC 49 that is connected to the positive electrode terminal 15 of the unit battery 11. In addition, the other end of the discharging resistor 57 is connected to the transistor 55.

The discharging resistor 57 is used to equalize the voltage value or a state of charge (SOC) in a plurality of the unit batteries 11. The cell monitoring IC 49 can acquire a voltage value in each of the plurality of unit batteries 11. Here, when a deviation is present in the voltage value in the plurality of unit batteries 11, equalization processing can be performed. When the battery assembly 47 is continuously charged and discharged in a state in which a deviation is present in the voltage value of the plurality of unit batteries 11 is present, only a voltage value of a specific unit battery 11 may reach an upper limit voltage or a lower limit voltage. In this case, charging or discharging is limited in other unit batteries 11 except for the specific unit battery 11, and thus it is difficult to efficiently perform charging and discharging.

Accordingly, when the deviation of the voltage value is suppressed through the equalization processing, it is possible to efficiently charge and discharge the entirety of the unit batteries 11. For example, in the equalization processing, a unit battery 11, which exhibits the highest voltage value, is specified, and the unit battery 11 is discharged to allow a discharging current to flow to the discharging resistor 57. When the unit battery 11 is discharged, it is possible to lower the voltage value of the unit battery 11. In this manner, it is possible to suppress a deviation of the voltage value in the plurality of unit batteries 11 by discharging the unit battery 11 that exhibits the highest voltage value.

Here, the cell monitoring IC 49 includes a switch that is electrically connected to the discharging resistor 57 in series. When the switch is turned on, it is possible to allow a discharging current of the unit battery 11 to flow to the discharging resistor 57. Two electric power lines 63 are connected to the cell monitoring IC 49. One end of one of the electric power lines 63 is connected to the positive electrode terminal 15 through the resistor 65, and the other end is connected to a VCC terminal of the cell monitoring IC 49. One end of the other electric power line 63 is connected to the negative electrode terminal 17, and the other end is connected to a GND terminal of the cell monitoring IC 49.

A thermistor can be connected to the cell monitoring IC 49. The thermistor is used to detect a temperature of the unit battery 11. Here, one end of the thermistor is connected to the cell monitoring IC 49, and the other end of the thermistor is grounded. A reference voltage at the inside of the cell monitoring IC 49 is generated from a power supply voltage that is input from the VCC terminal, and is divided by a standard resistor and the thermistor. A divided voltage value is input to the cell monitoring IC 49. When a resistance value of the thermistor varies in correspondence with a temperature of the unit battery 11, a voltage value that is input to the cell monitoring IC 49 also varies. According to this, the cell monitoring IC 49 monitors the input voltage value to acquire a temperature of the unit battery 11.

The communication line 31 connects a plurality of the voltage detection substrates 27 which are respectively mounted on the plurality of unit batteries 11 so as to connect the plurality of voltage detection substrates 27 and the battery ECU 67 to each other. Furthermore, the communication line 31 may perform a communication by connecting the voltage detection substrates 27 to the battery ECU 67 in a state of dividing the voltage detection substrates 27 into a plurality of groups, or may perform a multiplex communication by integrally connecting the voltage detection substrates 27 to the battery ECU 67. In a case of the multiplex communication, as the communication line 31, a coated electric wire that is a solid wire can be used. IN addition, in a case of connecting the voltage detection substrates 27 to the battery ECU 67 in a state of dividing the voltage detection substrates 27 into the plurality of groups, a flat cable, FPC, FFC, and the like can be used. The communication line 31 can be electrically connected to the voltage detection substrates 27 through welding, pressure welding, and the like.

Next, description will be given of a method of assembling the electric storage device 100 including the battery monitoring device 110 configured as described above.

FIGS. 6A to 6C, and FIGS. 7A to 7C are views illustrating an assembling process of the electric storage device 100 including the battery monitoring device 110 illustrated in FIG. 1.

Figure 6A:
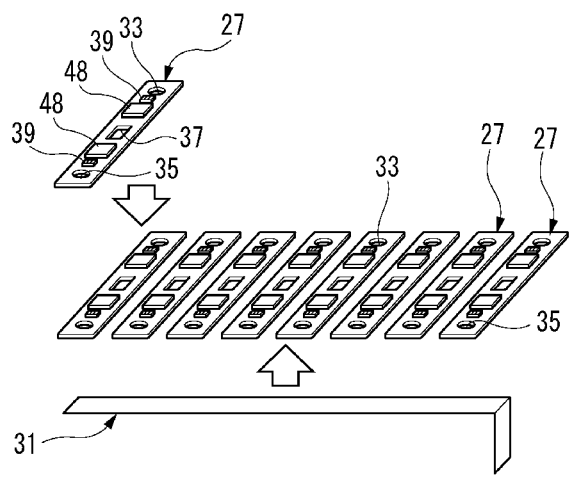
FIGS. 6A to 6C are views illustrating a process of assembling the electric storage device including the battery monitoring device illustrated in FIG. 1.
Figure 6B:
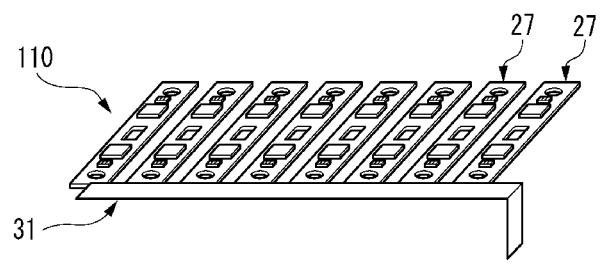

When assembling the battery monitoring device 110, first, as illustrated in FIGS. 6A and 6B, the voltage detection substrates 27 in a number corresponding to the number of the unit batteries 11 and the communication line 31 are connected to each other.

Figure 6C:
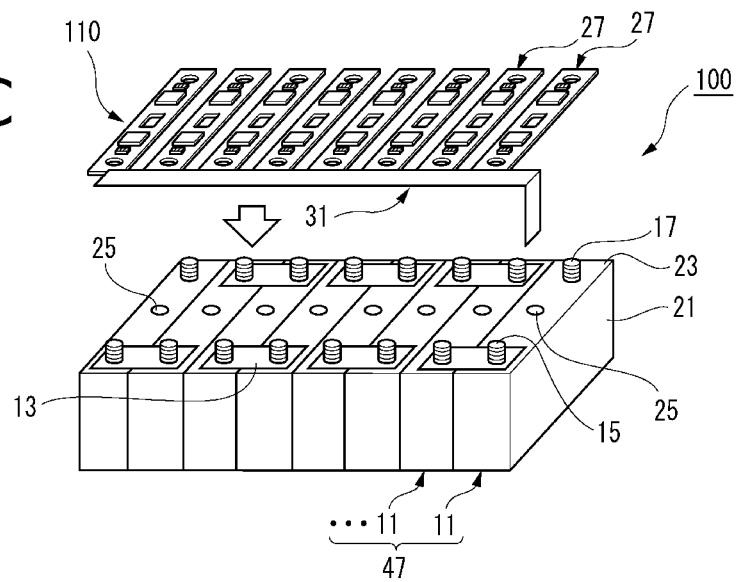

Next, as illustrated in FIG. 6C, a plurality of the voltage detection substrates 27, which are integrally connected on a left side by the communication line 31, are assembled to a battery assembly 47. In the battery assembly 47, the unit batteries 11 in a necessary number are connected to each other by the bus bar 13.

Figure 7A:
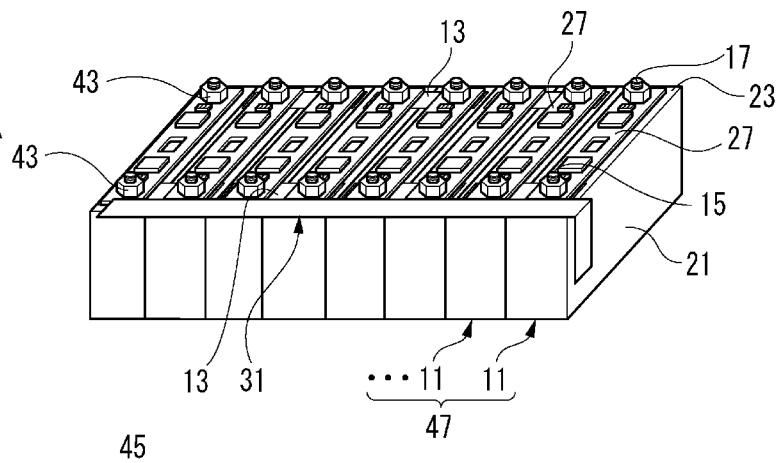
FIGS. 7A to 7C are views illustrating the same assembling process.

As illustrated in FIG. 7A, in the voltage detection substrates 27, the positive electrode terminal 15 is inserted into the positive electrode terminal hole 33, and the negative electrode terminal 17 is inserted into the negative electrode terminal hole 35. In addition, the battery smoke exhaust port 37 of each of the voltage detection substrates 27 is disposed to match the valve 25 of the unit battery 11. In addition, the voltage detection substrates 27 are fixed to the upper surface 23 of the battery main body 21 by the nut 43 that is screwed to the positive electrode terminal 15 or the negative electrode terminal 17.

Figure 7B:
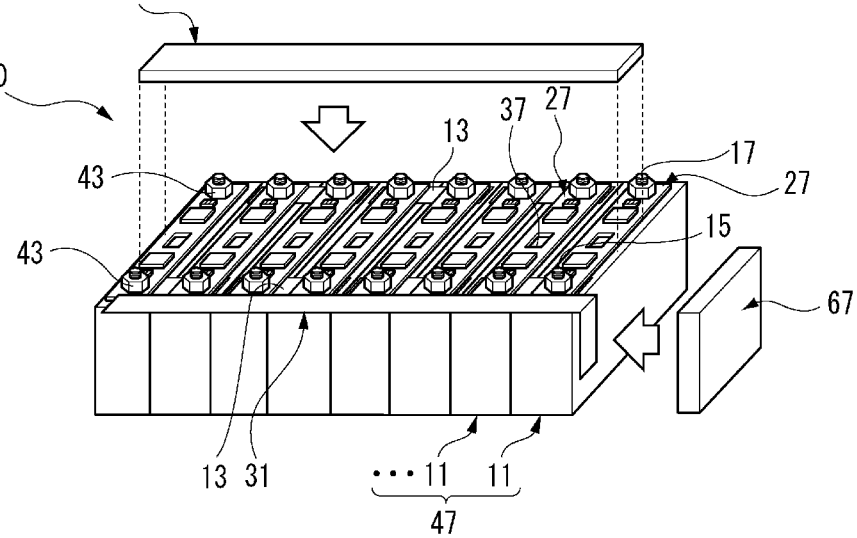

Next, as illustrated in FIG. 7B, the duct 45 is assembled to the upper surface of the plurality of voltage detection substrates 27. The assembling of the duct 45 is performed in such a manner the duct 45 communicates with the battery smoke exhaust port 37 of the voltage detection substrate 27.

Figure 7C:
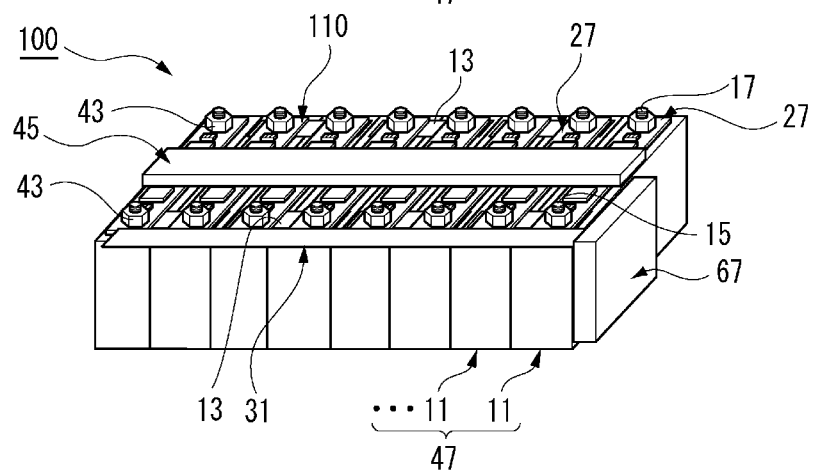

Finally, as illustrated in FIG. 7C, the battery ECU 67 is assembled to a front surface of the battery assembly 47, and thus the communication line 31 is connected to the battery ECU 67. According to this, the assembling of the electric storage device 100 including the battery monitoring device 110 is completed.

Next, description will be given of Modification Example 1 of the method of assembling the battery monitoring device 110 in the electric storage device 100 with reference to FIGS. 8A to 8C, and FIG. 9.

Figure 8A:
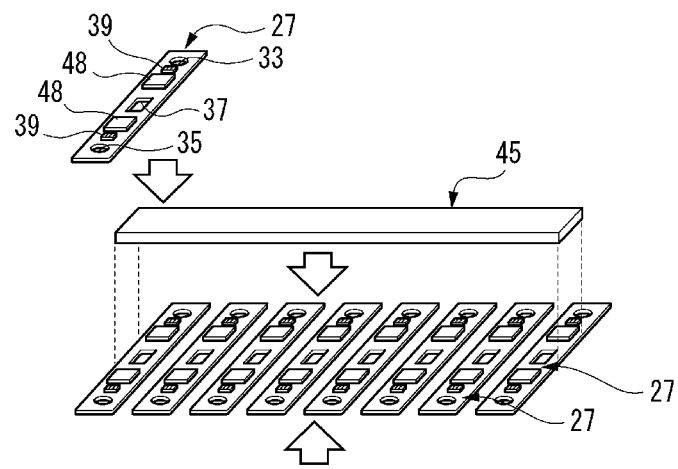
FIGS. 8A to 8C are views illustrating an assembling process of Modification Example 1 of the battery monitoring device in the electric storage device illustrated in FIG. 1.
Figure 8B:
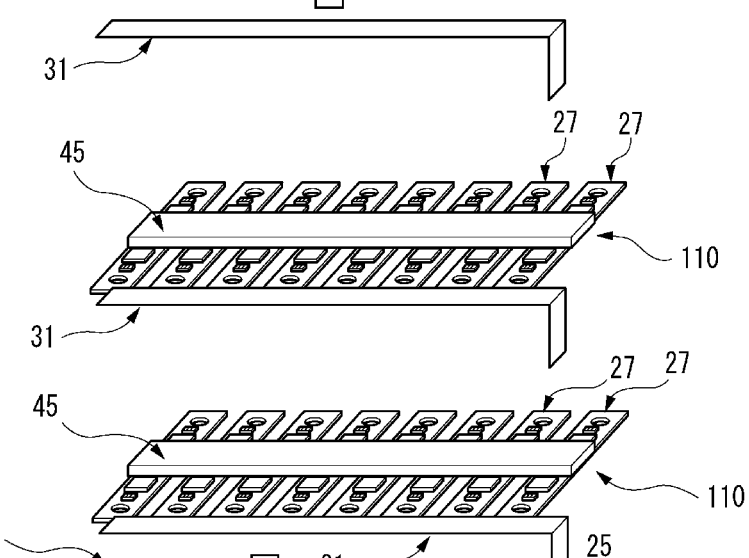

In the assembling method of Modification Example 1, first, as illustrated in FIGS. 8A and 8B, the communication line 31 is integrally connected to a left side of the voltage detection substrates 27 in a number corresponding to the number of the unit batteries 11, and the duct 45 is assembled in advance to the voltage detection substrates 27 which are integrally connected.

Figure 8C:
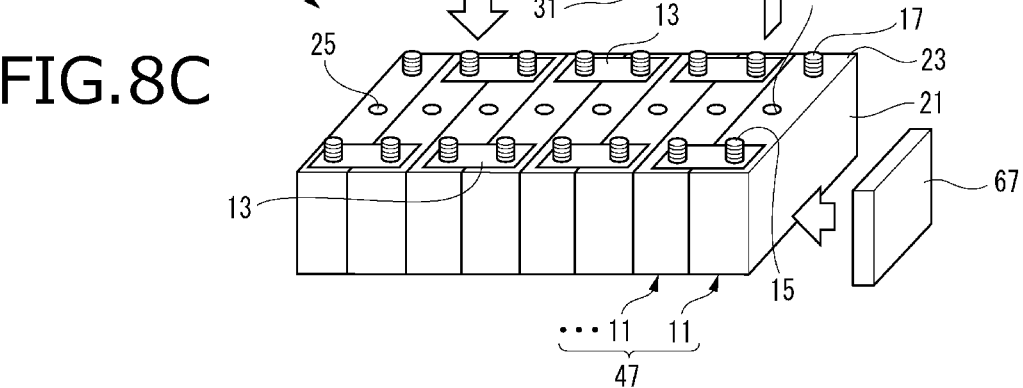

Next, as illustrated in FIG. 8C, the integrally connected voltage detection substrates 27, the communication line 31, and the duct 45 are assembled to the battery assembly 47 as the battery monitoring device 110. In the battery assembly 47, the unit batteries 11 in a necessary number are connected to each other by the bus bar 13.

Figure 9:
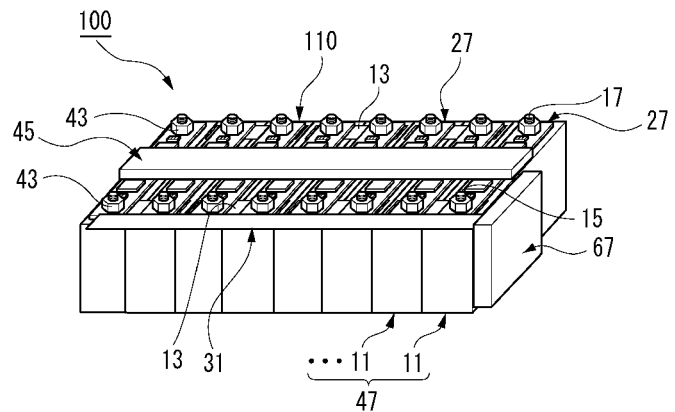
FIG. 9 is a view illustrating the same assembling process.

In addition, as illustrated in FIG. 9, as the battery monitoring device 110, the voltage detection substrates 27 which are integrally connected to each other, the communication line 31, and the duct 45 are fixed to the battery assembly 47 by the nut 43 that is screwed to the positive electrode terminal 15 or the negative electrode terminal 17.

Finally, the battery ECU 67 is assembled to the front surface of the battery assembly 47, and thus the communication line 31 is connected to the battery ECU 67. According to this, the assembling of the electric storage device 100 including the battery monitoring device 110 is completed.

Next, description will be given of Modification Example 2 of the method of assembling the battery monitoring device 110 in the electric storage device 100 with reference to FIG. 10A to FIG. 12B.

Figure 10A:
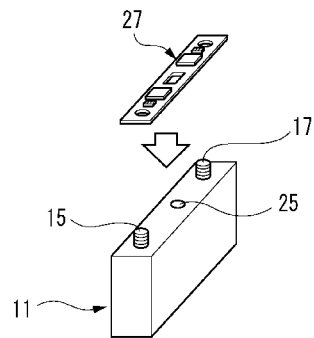
FIGS. 10A to 10C are views illustrating an assembling process of Modification Example 2 of the battery monitoring device in the electric storage device illustrated in FIG. 1.
Figure 10B:
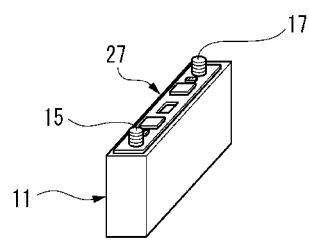

In the assembling method of Modification Example 2, first, as illustrated in FIGS. 10A and 10B, the voltage detection substrate 27 is assembled to an elementary body of the unit battery 11.

Figure 10C:
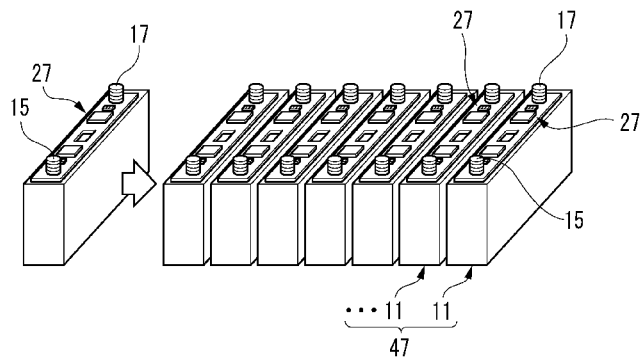

Next, as illustrated in FIG. 10C, a plurality of the unit batteries 11, to which the voltage detection substrate 27 is assembled, are combined in correspondence to the number of necessary cells.

Figure 11A:
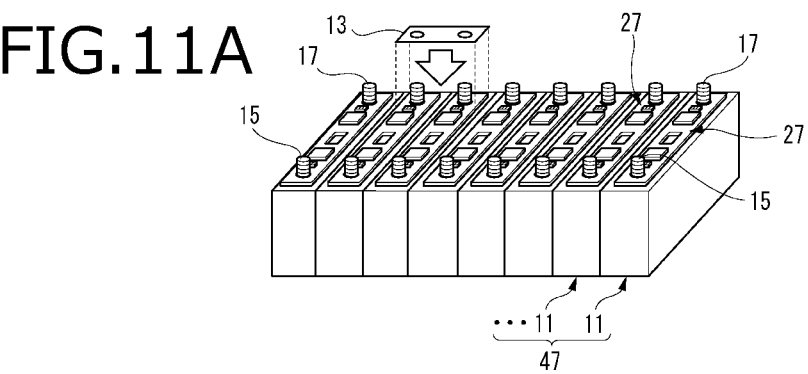
FIGS. 11A to 11C are views illustrating the same assembling process.
Figure 11B:
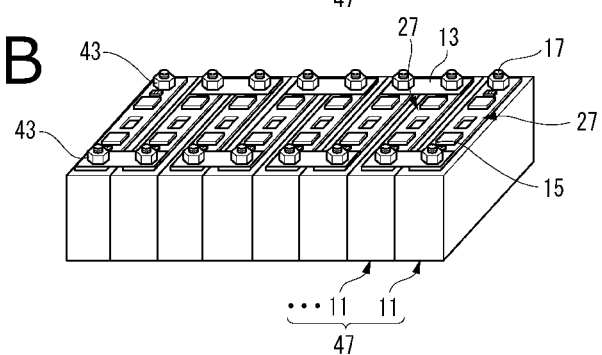

As illustrated in FIGS. 11A and 11B, the bus bar 13 is assembled to the positive electrode terminal 15 and the negative electrode terminal 17 in the plurality of unit batteries 11 to electrically connect the plurality of unit batteries 11.

Figure 11C:
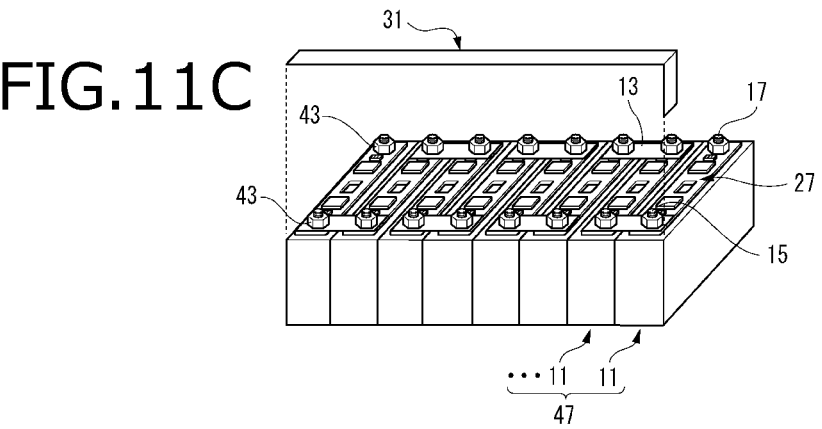

Next, as illustrated in FIG. 11C, the communication line 31, which is disposed on a left side of the battery assembly 47, is connected to each of a plurality of the voltage detection substrates 27 which are assembled to the battery assembly 47.

Figure 12A:
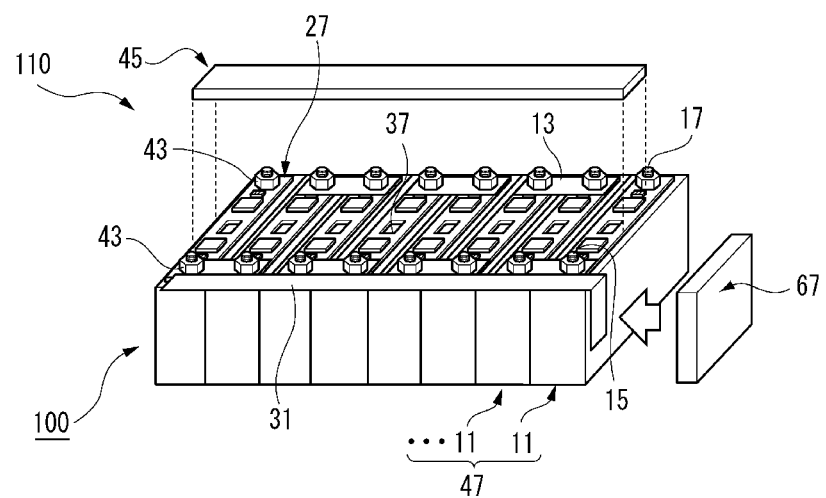
FIGS. 12A and 12B are views illustrating the same assembling process.

Next, as illustrated in FIG. 12A, the duct 45 is assembled to the upper surface of the plurality of voltage detection substrates 27. The assembling of the duct 45 is performed in such a manner the duct 45 communicates with the battery smoke exhaust port 37 of the voltage detection substrate 27.

Figure 12B:
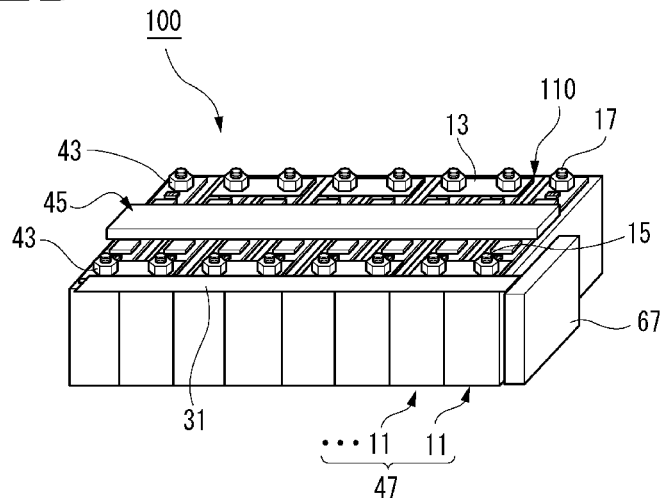

Finally, as illustrated in FIG. 12B, the battery ECU 67 is assembled to a front surface of the battery assembly 47, and thus the communication line 31 is connected to the battery ECU 67. According to this, the assembling of the electric storage device 100 including the battery monitoring device 110 is completed.

Next, an operation of the above-described configuration will be described.

Figure 13:
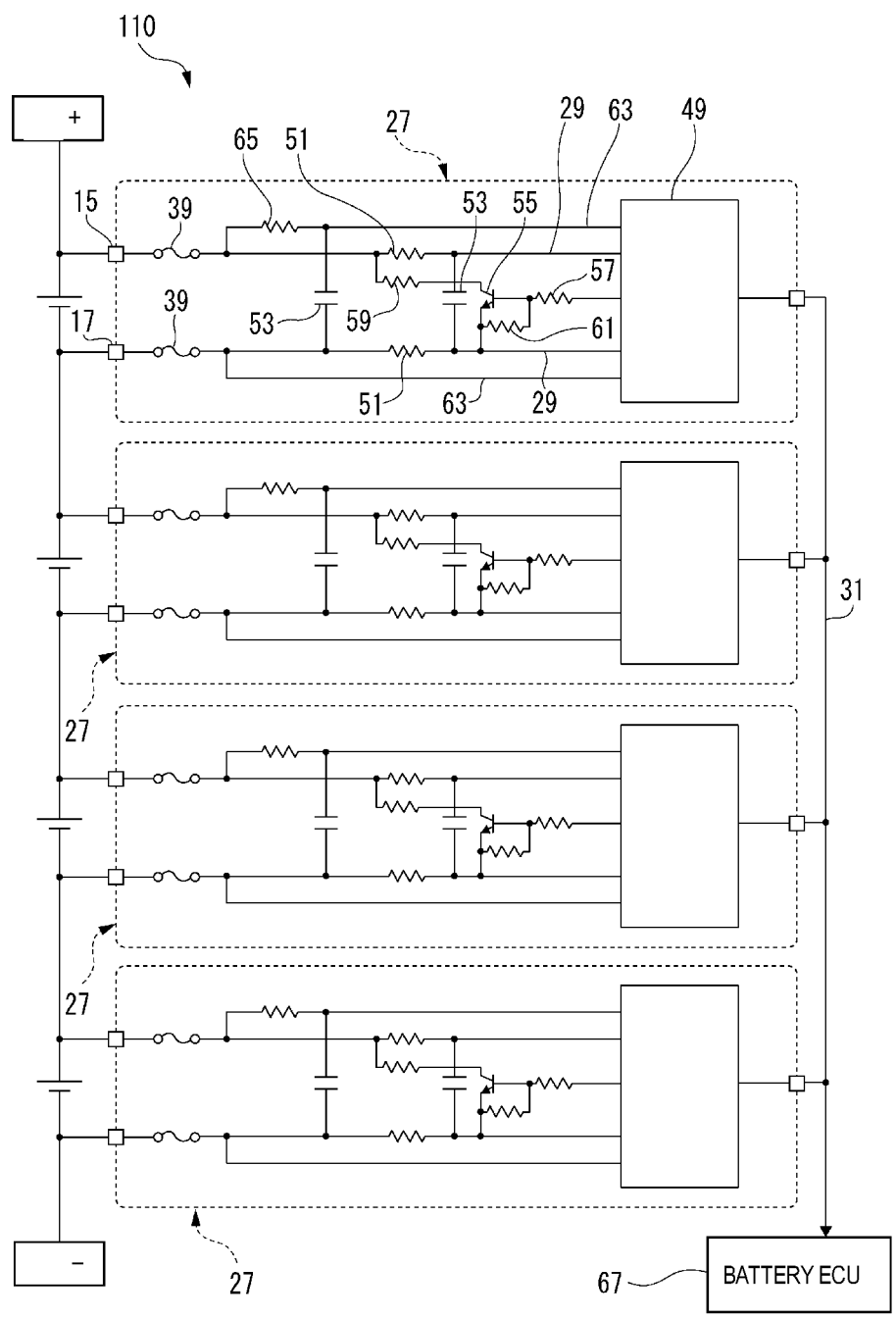
FIG. 13 is a view illustrating a circuit block of the battery monitoring device in the electric storage device illustrated in FIG. 1.

In the electric storage device 100 according to this embodiment, as illustrated in FIG. 13, the plurality of voltage detection substrates 27 which are respectively mounted to the unit batteries 11, and the battery ECU 67 are connected to each other with the communication line 31, thereby constituting the battery monitoring device 110. Accordingly, even when the number of the unit batteries 11 increases or decreases, it is possible to easily cope with the increase or the decrease through addition or reduction of the voltage detection substrate 27. In addition, it is also easy to circuit-print the voltage detection line 29 in the voltage detection substrate 27, or it is also easy to dispose the communication line 31 on a single side of the battery assembly 47. Accordingly, it is possible to simplify wiring.

In addition, in the battery monitoring device 110, the plurality of voltage detection substrates 27 are respectively mounted to the plurality of unit batteries 11. The plurality of voltage detection substrates 27 are connected to each other by the communication line 31. Accordingly, the communication line 31, which connects the plurality of voltage detection substrates 27, can absorb a pitch tolerance of the positive electrode terminal 15 and the negative electrode terminal 17 between the plurality of unit batteries 11 due to an individual difference of a cell, expansion, and the like.

In addition to this configuration, in the battery monitoring device 110, since the electronic circuit 48 configured to detect a voltage of each of the unit batteries 11 is mounted on each of the voltage detection substrates 27, it is possible to realize downsizing of the battery ECU 67 in correspondence with the electronic circuit 48. According to this, a reduction in size and weight of components, and a low profile of the components are realized. In addition, it is possible to exchange the voltage detection substrate 27 with new one for each of the unit batteries 11, and thus component exchangeability is improved. In addition, the chip fuse 39 of the voltage detection line 29 is provided in an upstream circuit in the immediate vicinity of the unit battery 11, and thus it is possible to improve high-voltage stability.

Next, description will be given of an electric storage device including a battery monitoring device according to a second embodiment of the invention.

Figure 14:
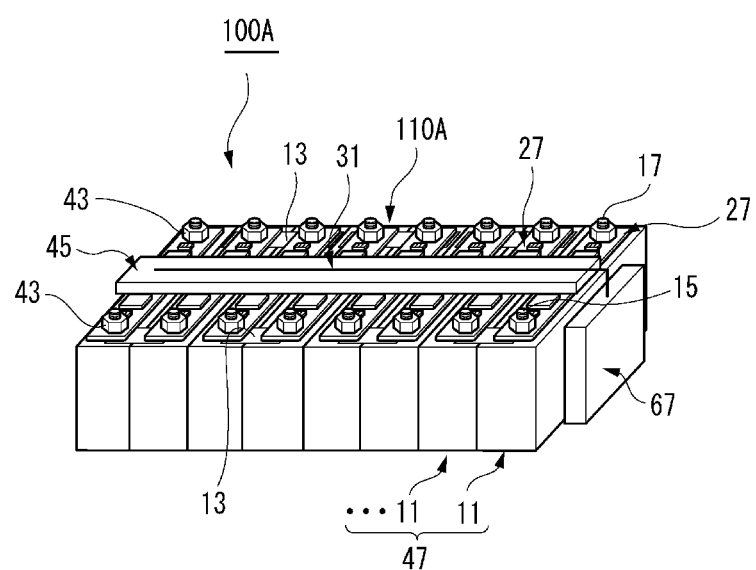
FIG. 14 is a perspective view of an electric storage device including a battery monitoring device according to a second embodiment of the invention.

FIG. 14 is a perspective view of an electronic storage device 100A including a battery monitoring device 110A according to the second embodiment in which a voltage detection substrate 27 and a duct 45 are integrated with each other. In this second embodiment, the same reference numeral will be given to the same configuration described in the first embodiment, and redundant description thereof will not be repeated.

As is the case with the configuration of the electric storage device 100 according to the first embodiment, in the electronic storage device 100A including the battery monitoring device 110A according to the second embodiment, a unit battery 11 includes a valve 25 that exhausts a gas, which is generated at the inside, to the outside. A battery smoke exhaust port 37, through which the gas exhausted from the valve 25 passes and is guided to the duct 45 that is mounted to a battery assembly 47, is formed in a voltage detection substrate 27. On the other hand, the duct 45 has an integral structure with a plurality of the voltage detection substrates 27. Accordingly, the duct 45 is integrally provided with a communication line 31 that is connected to each of the voltage detection substrates 27.

The voltage detection substrates 27 and the duct 45 may be integrally molded in advance, or may be mechanically coupled to each other in an integral structure after being formed as an individual body.

In the battery monitoring device 110A according to this second embodiment, since the plurality of voltage detection substrates 27 has an integral structure with the duct 45, it is possible to collectively mount the duct 45 and the voltage detection substrates 27 to the battery assembly 47 without deteriorating a function of exhausting the gas, which is generated at the inside of the unit battery 11, to the outside. According to this, assembling becomes easy. In addition, the number of components is reduced, and thus simplification of component management is accomplished.

Next, description will be given of a battery monitoring device 210 according to a third embodiment of the invention.

Figure 15A:
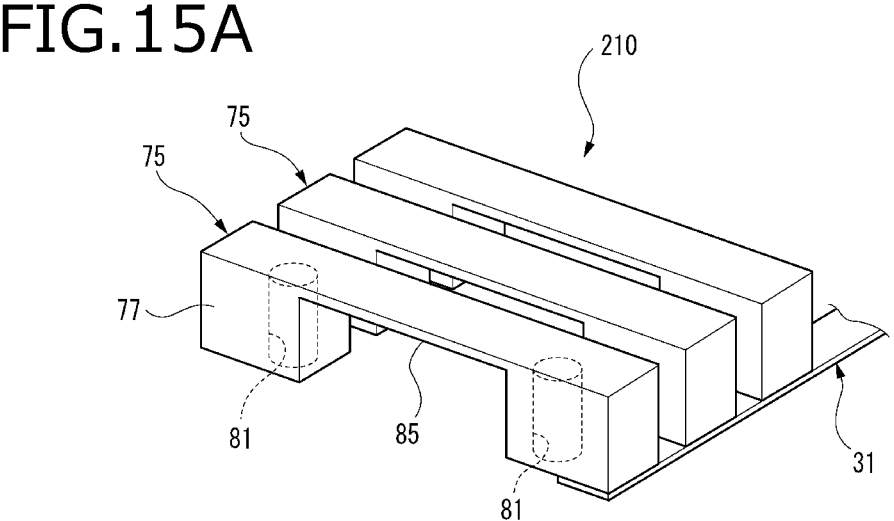
FIG. 15A is a perspective view illustrating a battery monitoring module of a battery monitoring device according to a third embodiment of the invention.
Figure 15B:
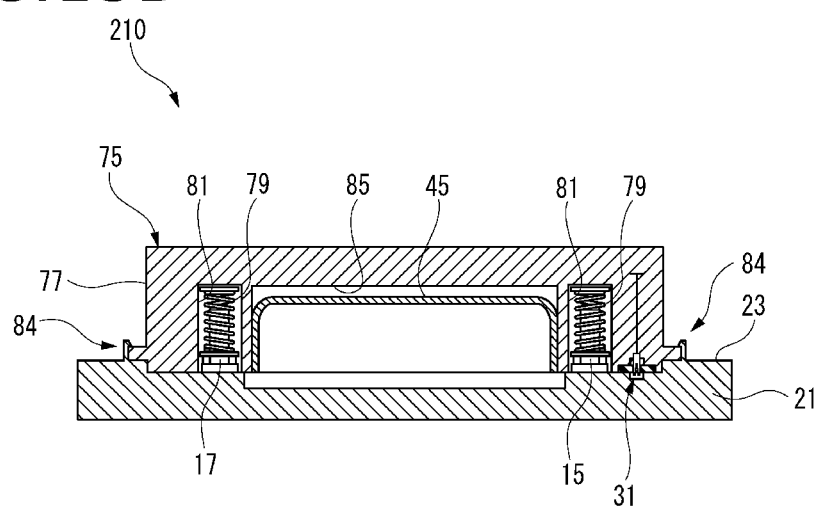
FIG. 15B is a cross-sectional view of the battery monitoring module illustrated in FIG. 15A.
Figure 16:
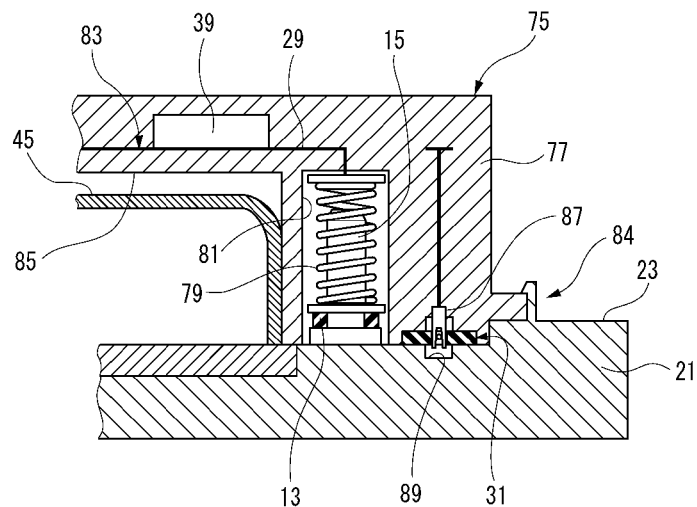
FIG. 16 is a main portion enlarged cross-sectional view of a connection portion between a voltage detection line and a communication line of the battery monitoring module illustrated in FIG. 15B.

FIG. 15A is a perspective view illustrating a battery monitoring module 75 of a battery monitoring device 210 according to the third embodiment of the invention, FIG. 15B is a cross-sectional view of the battery monitoring module 75 illustrated in FIG. 15A, and FIG. 16 is a main portion enlarged cross-sectional view of a connection portion between a voltage detection line 29 and a communication line 31 of the battery monitoring module 75 illustrated in FIG. 15B. Furthermore, in this third embodiment, the same reference numeral will be given to the same configuration described in the first embodiment, and redundant description thereof will not be repeated.

As illustrated in FIGS. 15A and 15B, and FIG. 16, the battery monitoring device 210 according to this third embodiment includes the battery monitoring module 75. The battery monitoring module 75 includes a voltage detection substrate 83, a housing 77, and a spring terminal 79.

The housing 77 is formed by integrally molding a pair of electrode insertion concave portions 81 which respectively cover a positive electrode terminal 15 and a negative electrode terminal 17 in each of the unit batteries 11, and a voltage detection substrate 83 with an insulating resin. The voltage detection substrate 83 is connected to the positive electrode terminal 15 and the negative electrode terminal 17 by the spring terminal 79, and thus the positive electrode terminal hole 33 and the negative electrode terminal hole 35, which are formed in the above-described voltage detection substrate 27, are not necessary. In addition, the voltage detection substrate 83 is provided on an upper surface of a duct accommodating concave portion 85 that is formed in the housing 77, and thus the battery smoke exhaust port 37, which is formed in the above-described voltage detection substrate 27, is also not necessary.

A pair of the spring terminals 79 provided in the battery monitoring module 75 electrically connects the positive electrode terminal 15 and the voltage detection line 29, and electrically connects the negative electrode terminal 17 and the voltage detection line 29 in the electrode insertion concave portions 81. For example, the battery monitoring module 75 can be fixed to the unit battery 11 by an engagement structure 84 that is provided between an upper surface 23 of a battery main body 21 and the battery monitoring module 75. The battery monitoring module 75, which is fixed to the unit battery 11 by the engagement structure 84, can respectively bias the spring terminals 79 to the positive electrode terminal 15 and the negative electrode terminal 17 by using an elastic restoring force of the spring terminals 79 for elastic contact therebetween.

In the battery monitoring module 75, the voltage detection substrate 83 is embedded in the housing 77 through molding, and the communication line 31 is disposed between the unit battery 11 and the battery monitoring module 75. In addition, the battery monitoring module 75 includes a protruding pressure-contact blade 87 on a bottom surface. For example, a pressure-contact blade avoiding concave portion 89 is formed in the upper surface 23 of the battery main body 21.

Furthermore, the spring terminals 79 may be set as a leaf spring without limitation to a coil spring.

Next, description will be given of a method of assembling an electric storage device 200 including the battery monitoring device 210 according to this third embodiment.

Figure 17A:
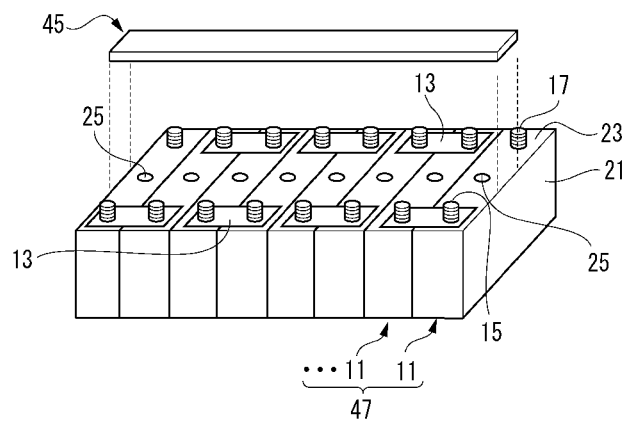
FIGS. 17A and 17B are views illustrating a process of assembling an electric storage device including the battery monitoring device illustrated in FIG. 15.
Figure 17B:
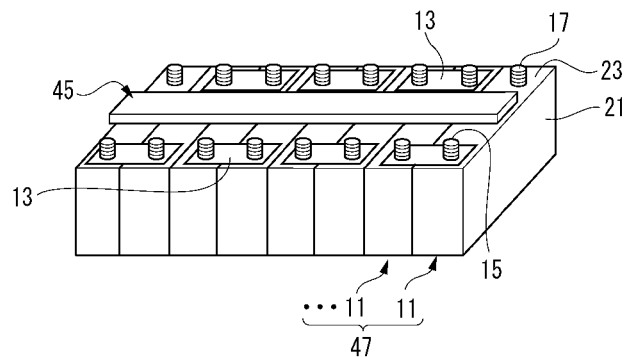

When assembling the electric storage device 200 including the battery monitoring device 210, first, as illustrated in FIGS. 17A and 17B, a bus bar 13 is assembled to the positive electrode terminal 15 and the negative electrode terminal 17 in a plurality of the unit batteries 11, and a duct 45 is assembled to a battery assembly 47 in which the plurality of unit batteries 11 are electrically connected to each other. The duct 45 is disposed to cover the valve 25 of the battery main body 21.

Figure 18A:
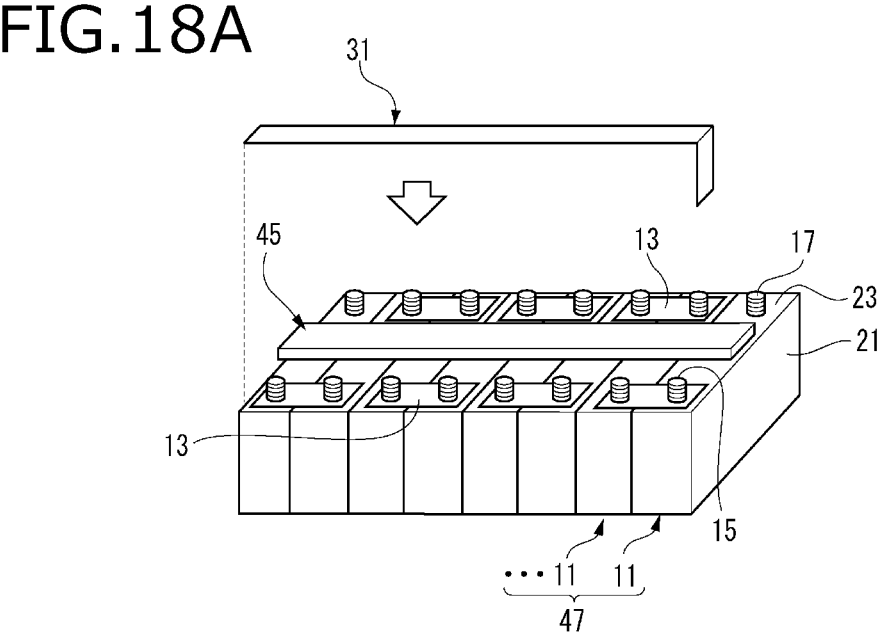
FIGS. 18A and 18B are views illustrating the same assembling process.
Figure 18B:
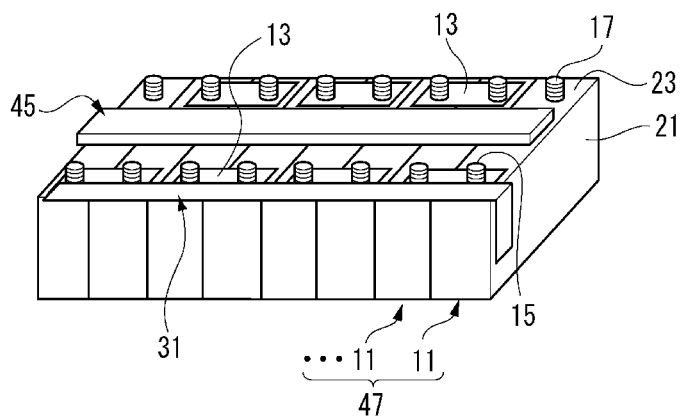

Next, as illustrated in FIGS. 18A and 18B, the communication line 31 is disposed along a left side of the battery assembly 47 to which the duct 45 is assembled.

Figure 19A:
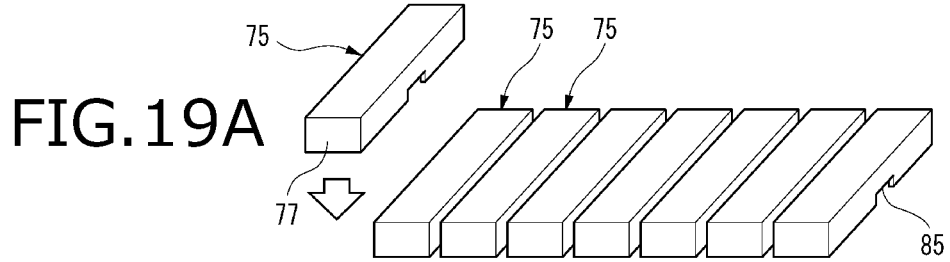
FIGS. 19A to 19C are views illustrating the same assembling processes.

In addition, as illustrated in FIG. 19A, the battery monitoring module 75 is arranged in a number corresponding to the number of the unit batteries 11.

Figure 19B:
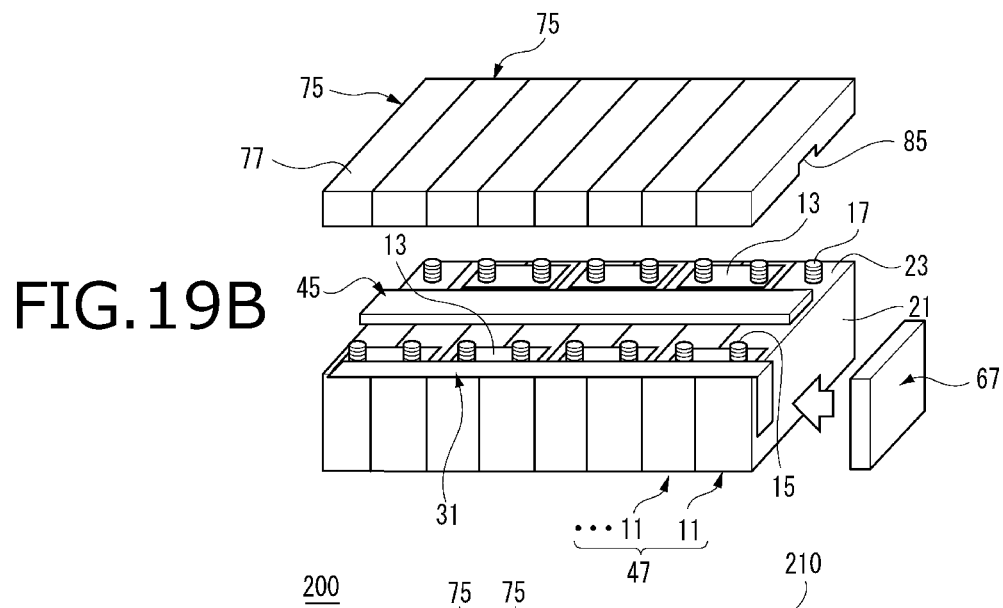

Next, as illustrated in FIG. 19B, a plurality of the battery monitoring modules 75, which are provided with the pair of electrode insertion concave portions 81 in the housing 77, are sequentially assembled to the unit batteries 11 of the battery assembly 47.

The spring terminal 79 is accommodated in the electrode insertion concave portion 81 of the housing 77. The battery monitoring modules 75 are respectively mounted to the unit batteries 11 in such a manner that the positive electrode terminal 15 and the negative electrode terminal 17 are inserted into the electrode insertion concave portions 81. The pair of positive electrode terminal 15 and the negative electrode terminal 17, which is inserted into the electrode insertion concave portions 81, is electrically connected to the voltage detection line 29 by the spring terminal 79. Accordingly, in the battery monitoring device 210, it is possible to connect a pair of the positive electrode terminal 15 and the negative electrode terminal 17 in each of the unit batteries 11 to the voltage detection line 29 by each of the battery monitoring modules 75 in a one-touch manner. Accordingly, work of mounting of the voltage detection substrate 83 becomes easy.

In addition, according to the battery monitoring device 210, the communication line 31 is placed on the upper surface of the battery assembly 47 at a predetermined position, and the battery monitoring module 75 is fixed by the engagement structure 84. Accordingly, it is also possible to easily pressure-contact connect the voltage detection substrate 83 and the communication line 31 by the pressure-contact blade 87.

Figure 19C:
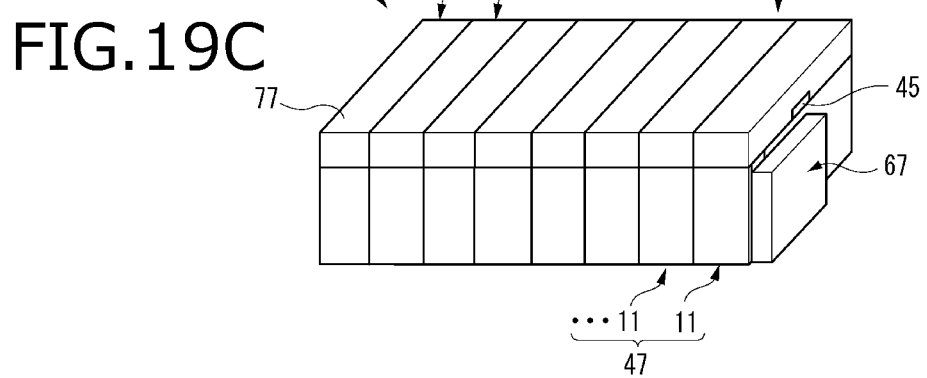

Finally, as illustrated in FIG. 19C, the battery ECU 67 is assembled to the front surface of the battery assembly 47, and the thus the communication line 31 is connected to the battery ECU 67. According to this, assembling of the electric storage device 200 including the battery monitoring device 210 is completed.

Figure 20:
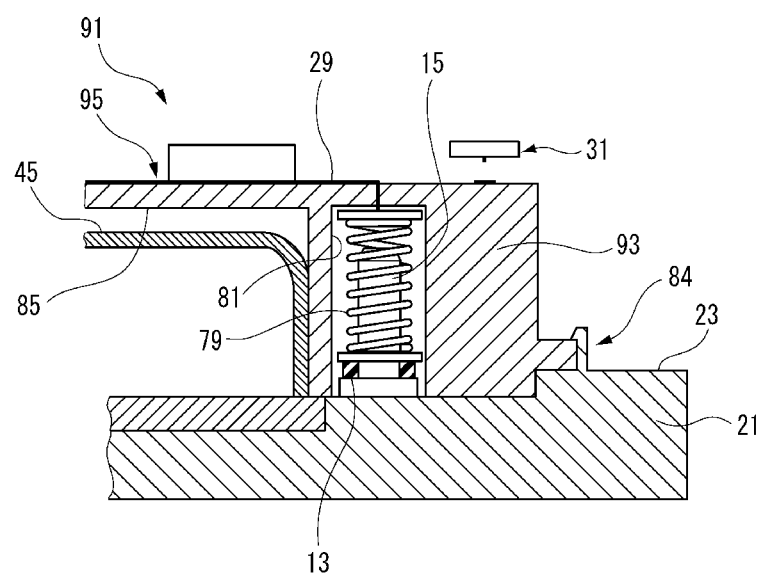
FIG. 20 is a main portion enlarged cross-sectional view illustrating a modification example of the connection portion in the battery monitoring module illustrated in FIG. 16.

FIG. 20 is a main portion enlarged cross-sectional view illustrating a modification example of the connection portion in the battery monitoring module 75 illustrated in FIG. 16.

In a battery monitoring module 91 according to this modification example, a voltage detection substrate 95 is provided integrally with the housing 93 in a state of being exposed on an upper surface of the housing 93. The communication line 31 can be connected to the voltage detection substrate 95 of the battery monitoring module 91 through welding and the like.

According to the battery monitoring module 91 according to this modification example, it is possible to simplify a structure of the housing 93.

Hereinbefore, description has been given of various embodiments with reference to the accompanying drawings, but it is needless to say that the invention is not limited to the examples. It should be understood by those skilled in the art that various medication examples and variation examples can be made in the scope described in the appended claims, and these examples pertain to the technical range of the invention.

For example, in the above-described configuration examples, description has been given with reference to an example in which the electrode is constituted by a columnar electrode, but the electrode may be a flat electrode. Accordingly, connection between the voltage detection line 29 or the bus bar 13, and the electrode may be performed through welding and the like without limitation to the screwing. In addition, the voltage detection line 29 may include a typical covered electric wire, a flat cable, FPC, FFC, and the like without limitation to circuit printing on a substrate.

Accordingly, according to the battery monitoring devices 110, 110A, and 210 according to this embodiment, even when the number of the unit batteries 11 increases or decreases, it is possible to easily cope with the increase or the decrease through addition or reduction of the voltage detection substrate 27 or 83. In addition, it is also possible to absorb a pitch tolerance of the positive electrode terminal 15 and the negative electrode terminal 17 between respective unit batteries 11.

Here, characteristics of the embodiments of the battery monitoring device according to the invention will be described below in brief.

[1] A battery monitoring device (110, 110A, 210), including:
a plurality of voltage detection line (29), each of which configured to be electrically connected to an electrode (a positive electrode terminal 15 and a negative electrode terminal 17) of a respective one of a plurality of unit batteries (11) in a battery assembly (47), the battery assembly being constituted by the unit batteries (11);
a plurality of electronic circuits (48), each of which configured to be connected to a respective one of the voltage detection lines and to detect a voltage of a corresponding one of the unit batteries;
a plurality of voltage detection substrates (27, 83) configured to be mounted to the unit batteries respectively, wherein each of the voltage detection lines and each of the electronic circuits are mounted on a respective one of the voltage detection substrates; and
a communication line (31) that connects the plurality of voltage detection substrates and a battery control unit (a battery ECU 67).

[2] The battery monitoring device (110, 110A) according to [1], further including:
a duct (45) configured to be mounted to the battery assembly,
wherein each of the voltage detection substrates has an opening (a battery smoke exhaust port 37), through which gas exhausted from a valve (25) passes and is guided to the duct, and the valve being provided on each of the unit batteries so as to release the gas being generated at the inside of a corresponding one of the unit batteries to the outside; and
wherein the duct has an integral structure with the plurality of voltage detection substrates.

[3] The battery monitoring device (210) according to [1], further including:
a plurality of battery monitoring modules (75), each of which includes a housing (77) being integrally formed on the corresponding one of the voltage detection substrates (83), each of the battery monitoring modules being mounted to respective one of the unit batteries,
wherein a pair of electrode insertion concave portions (81) configured to cover a pair of the electrodes in corresponding one of the unit batteries is formed in the respective one of the housings of the battery monitoring modules; and
wherein a spring terminal (79) is contained in each of the pair of electrode insertion concave portions and configures to electrically connect the electrode and the voltage detection line in each of the pair of electrode insertion concave portions.

What is claimed is:
1. A battery monitoring device, comprising:
a plurality of voltage detection lines, each of which is electrically connected to an electrode of a respective one of a plurality of unit batteries in a battery assembly, the battery assembly comprising the plurality of unit batteries;
a plurality of electronic circuits, each of which is connected to a respective one of the plurality of voltage detection lines and is configured to detect a voltage of a corresponding one of the plurality of unit batteries;
a plurality of voltage detection substrates, each of the plurality of voltage detection substrates being respectively mounted to a unit battery of the plurality of unit batteries, wherein each of the plurality of voltage detection lines and each of the plurality of electronic circuits are mounted on a respective one of the plurality of voltage detection substrates;

a communication line that connects the plurality of voltage detection substrates and a battery control unit; and a plurality of housings, each of which is integrally formed on a corresponding one of the plurality of voltage detection substrates, wherein a pair of electrode insertion concave portions covering a pair of electrodes in corresponding ones of the plurality of unit batteries is formed in the respective ones of the plurality of housings; and wherein a spring terminal is contained in each of the pair of electrode insertion concave portions and electrically connects an electrode and a voltage detection line in each of the pair of electrode insertion concave portions.

2. The battery monitoring device according to claim 1, further comprising:

a duct mounted to the battery assembly, wherein each of the plurality of voltage detection substrates has an opening, through which gas exhausted from a valve passes and is guided to the duct, the valve being provided on each of the plurality of unit batteries so as to release gas being generated at an inside of a corresponding one of the plurality of unit batteries to an outside thereof; and wherein the duct has an integral structure with the plurality of voltage detection substrates.

3. The battery monitoring device according to claim 1, further comprising:

a plurality of battery monitoring modules, each of which includes a housing of the plurality of housings and each of the plurality of battery monitoring modules is mounted to a respective one of the plurality of unit batteries.

4. The battery monitoring device according to claim 1, wherein the communication line is formed on a single side e of the battery assembly.

5. The battery monitoring device according to claim 1, wherein the communication line connects the plurality of voltage detection substrates to one another.

\* \* \* \* \*